US 6,534,427 B1

(12) United States Patent
Quemere

(10) Patent No.: US 6,534,427 B1
(45) Date of Patent: Mar. 18, 2003

(54) NIGHT GLOW GLAZE FOR CERAMICS

(76) Inventor: Christian R. Quemere, 112 Franklin Ave., Yonkers, NY (US) 10705

( * ) Notice: Subject to any disclaimer, the term of this patent is extended or adjusted under 35 U.S.C. 154(b) by 0 days.

(21) Appl. No.: 10/015,514

(22) Filed: Dec. 12, 2001

(51) Int. Cl.[7] .............................. C03C 8/14; C03C 8/00; C09K 11/02
(52) U.S. Cl. ............................ 501/17; 501/14; 501/22; 501/24; 501/21; 252/301.32
(58) Field of Search ............................... 501/14, 15, 16, 501/17, 18, 20, 21, 22, 23, 24, 32; 252/301.36

(56) References Cited

U.S. PATENT DOCUMENTS

| | | |
|---|---|---|
| 3,628,989 A | 12/1971 | Solmi |
| 3,804,666 A | 4/1974 | Eppler |
| 3,898,091 A | 8/1975 | Stout |
| 4,004,935 A | 1/1977 | Grosvenor |
| 4,805,551 A | 2/1989 | Marazzi |
| 4,839,313 A | 6/1989 | Kondo |
| 4,946,636 A | 8/1990 | Brunetti |
| 5,190,708 A | 3/1993 | Vitaliano |
| 5,366,763 A | 11/1994 | McDaniel |
| 5,427,825 A | 6/1995 | Murnick |
| 5,534,300 A | 7/1996 | Solntsev |
| 5,618,585 A | 4/1997 | Hechler |
| 5,736,248 A | 4/1998 | Solntsev |
| 5,989,636 A | 11/1999 | Wine |
| 6,066,363 A | 5/2000 | Kawai |
| 6,132,832 A | 10/2000 | Crichton |
| 6,174,608 B1 | 1/2001 | Bertocchi |
| 6,242,117 B1 | 6/2001 | Koga |

Primary Examiner—David Sample
Assistant Examiner—Elizabeth Bolden
(74) Attorney, Agent, or Firm—Lilling & Lilling P.C.

(57) ABSTRACT

A lead-free glow in the dark glaze is provided for ceramic bisques. It includes Frit, Lithium Carbonate, Borax, carboxmethylceullulose and a phosphorus pigment. In some applications, Bentonite and/or Magnesium Sulfate are used. Preservatives and deflocculants may be needed in some applications.

60 Claims, No Drawings

NIGHT GLOW GLAZE FOR CERAMICS

FIELD OF THE INVENTION

The invention is related to the commercial and residential construction industries and, in particular, to the ceramics industry.

BACKGROUND OF THE INVENTION

Ceramic products of all types have been commonly used in society for thousands of years. The Greeks and Romans, among others, used ceramic tiles in temples and palaces. Some of these artistic mosaics can still be seen and appreciated in archeological sites.

Over the years, many different finishes and glazes have been applied on the surface of the ceramics to provide luster or protection. The ceramic body itself that makes up the tile, whiteware, or pitcher (or other ceramic product) is typically made of single clays or of a mixture of different clays, as is well known. Ceramics can be made from raw materials, such as clay, kaolin, feldspar, wollastonite, talc, calcium carbonate, dolomite and other known materials. It is now known how to formulate ceramics from synthetic materials. Binders are used, as necessary, to achieve the required mechanical strength.

After firing, the glaze on the surface of the ceramic develops a vitreous, transparent or opaque surface. It can be glossy or dull, based on the end application of the particular ceramic. Glazes typically have 3 components. First, they include a frit of some type which, during firing, fuses and forms a compact layer on the surface of the ceramic. Pigments can be used to impart a desired chromatic characteristic. Suspending agents are used to obtain specific theological effects in the product. Depending on the end product, various inorganic substances may be used to obtain special effects in the glaze.

The glaze is a fused facial finish on the surface of the ceramic. It generally has a vitreous covering that is substantially impervious after firing, so it serves to protect the ceramic. It is the properties of the glaze that gives color and beauty enhancement and also provides the surface sealing, water resistance, and other characteristics of the ceramic.

Generally, either single firing or double firing techniques are used to apply the glaze, as is well known. Glazes typically have one or more frits, fillers, pigments and other additives, as required.

Especially on ceramic tiles that are used in home bathrooms and kitchens, there is a need to have ceramics that glow in the dark. In this manner, some level of illumination is available for the late night walker without the need for turning on an overhead light or lamp.

Many people, especially the elderly, have a need to arise in the middle of the night and to visit the bathroom. Typically, it can be hard to fumble to find the switch for an overhead light or for a lamp. Besides, turning a light on will awaken other sleepers.

There are many useful purposes for a glow in the dark glaze applied to ceramic products, such as: light switches that glow in the dark; and glow in the dark ceramic tiles used as emergency signs.

Nonetheless, though there is clear benefit and need for glow in the dark ceramics, no one in the ceramics industry has ever utilized a glow in the dark glaze for ceramic products.

Therefore, ceramics coated with a night glow finish or glaze are quite desirable. One problem is that a phosphorescent pigment is needed for this purpose. At temperatures of 1300° F. and higher, such phosphorescent pigments start to decompose. In order to properly mature non-leaded glazes, however, they must be fired at temperatures far above 1300° F. Lead based glazes could theoretically be fired at temperatures below 1000° F. to prevent the phosphorescent pigment from decomposing, but lead based glazes are prohibited in the USA due to health concerns.

Accordingly, the industry does not have an effective way to add phosphorescent pigments to ceramics glazes to achieve a night glow effect.

SUMMARY OF THE INVENTION

Therefore, it an object of this invention to provide a night glow ceramic glaze that includes a phosphorescent pigment, and which will not cause the phosphorescent pigment to decompose during firing. In a preferred embodiment, there is no lead, but the Invention also contemplates lead-based glazes with a phosphorescent pigment.

This may be accomplished by a glaze comprising: 82.60%±5% of frit, 1.31–10.31% of a first flux, 1.20–7.20% of a second flux, 0.46–1.06% of a thickener and 4.91–15.91% of a phosphorus pigment. In the preferred embodiment, the first flux is Lithium Carbonate, the second flux is Borax, and the thickener is a Cellulose Gum such as carboxmethylceullulose.

To improve the glaze a suspending agent, like Bentonite, and a suspension agent, like Magnesium Sulfate, may be used. Preservatives and deflocculants can be used to improve efficacy.

DETAILED DESCRIPTION OF THE INVENTION

A typical ceramic bisque is fired clay without glaze. For purposes of this invention and the herein disclosed glaze, it is best to use a bisque of average porosity.

In broadest contemplation, the night glow glaze comprises: 82.60%±5% of Frit, 1.31–10.31% of a first flux, 1.20–7.20% of a second flux, 0.46–1.06% of a thickener and 4.91–15.91% of a phosphorus pigment.

The frit is ideally a mixture of inorganic substance fused togther, generally in a furnace, and then quenched rapidly. Quenching can be accomplished either by a water batch or water cooled metal rolls. In the preferred embodiment, Frit #3269 from Ferro Corp. is used. As is common in all glazes, the frit is the dominant ingredient.

Also included within the definition of frit are ground glass used in making glazes and enamels and finely powdered glass. Enamel frits may be used. It is also possible to use frits containing lead.

Ferro Frit #3269 includes 8.1% Potassium Oxide ($K_2O$), 11.1% Sodium Monoxide ($Na_2O$), 0.1% Calcium Oxide (CaO), 1.0% Zinc Oxide (ZnO), 13.2% Aluminum Oxide ($Al_2O_3$), 15.2%, Boron Oxide ($B_2O_3$), 49.7% Silica (Silicon Dioxide)($SiO_2$), and 1.6% Iron (Fe). It has a melting range of 1400° F.

Any other frit may be used as long as it has a melting range of 1400° F. Other frit manufacturers that have analogous frits are General Colors—#GF-114, Pemco—#P-25, O. Hommel—#25, and #20-8077, #20-8076 and #20-8190 from Cerdec and #23901 from Johnson Matthey Co. It may be appreciated that most any standard frit used in the ceramic industry may be used.

In the glaze, a first flux is used to improve the brightness and to increase the firing range. The preferred first flux is Lithium Carbonate ($Li_2CO_3$), as it is a source of lithia ($Li_2O$), which is used in leadless glazes. Using more than 5% will render the surface of the fired glaze from a satin to a mat finish. The preferred amount is 3.31%. Since it also starts to decompose at 1300° F. (generally at about 1200° F.), it too creates the same concerns as the phosphorus pigment, which also decomposes at this temperature.

A second flux is used to lower the fusion point of the glaze. Borax ($Na_2B_4O_7 \cdot 10H_2O$) may generally be used. The preferred amount is 2.20%. If used in excess, it can create a thickening of the glaze to an unworkable jelly-like state.

Instead of the first flux (Lithium.Carbonate) and the second flux (Borax), lead could be used. Currently, this may not be permitted in the USA for health reasons, but new types of leads are being developed, which are safer and eventually such leads may be available for use in a glaze for ceramic tiles. Thus, 15.68% white lead could be used instead of Lithium Carbonate and Borax.

The two fluxes are need to lower the melt point and the firing temperature. Though one flux may sometimes be effective, in most cases using only one flux creates a rough surface on the ceramic and the color may be off.

Among the other compositions that may be used as the first or second flux are Sodium Nitrate ($NaNO_3$), Potassium Nitrate ($KNO_3$), Potassium Carbonate ($K_2CO_3$), Soda Ash ($Na_2CO_3$), Sodium Bicarbonate ($NaHCO_3$), Boric Acid ($H_3BO_3$), Anhydrous Borax ($Na_2B_4O_7$) and Cadmium (Cd). Depending on which of these compositions is used will depend the specific amount for example, one could use 2%–10% Sodium Nitrate (6% being the best), 2%–10% Potassium Nitrate (5% being the best), 1%–4% Potassium Carbonate (2% being the best), or 1%–5% Boric Acid.

Organic cellulose gums can be used as a thickener, binder and suspending agent. Carboxmethylceullulose is the one primarily used for the herein disclosed glaze. It is mixed with water to dissolve and age, before it is introduced to the glaze. The preferred amount is 0.66%. Other compositions that may be used as a thickener are Arabic Gum, Tragacanth Gum and Dextrin.

The final main ingredient is a phosphorus pigment. One of the properties of phosphors is that they are luminescent. Based on the particular phosphor that is selected, the color of the fluorescence and phosphorescence can be determined, e.g. green, yellow-green, yellow, blue or violet for full utilization of the invention, the selected phosphorus pigment should have a very long afterglow. Generally, the pigment should be able to be excited by any type of light, including outdoor sunlight shining into a room.

In the preferred embodiment, #P170140 Blue, manufactured by USR Optonix Inc., may be used. This is a Strontium Silicate compound, comprising Silicic Acid ($H_6Si_2O_7$), Magnesium Strontium Salt (1:1:2) Dysprosium and Europium Doped. It is very stable to moisture and sunlight. The maximum saturation is reached in about one minute after exposure to the light source. It has a long afterglow that lasts for more than twenty-four hours and is also very bright initially at the ten minute interval.

To improve efficacy of the glaze, a suspending agent, a suspension agent, a preservative and a deflocculant may be used separately or together.

The suspending agent is optional in the glaze and, when it is used, it serves to overcome settling in the glaze mixture and keeps the ingredients floating. Bentonite is the preferred ingredient. This is a natural clay-like substance—a hydrous silicate of alumina derived from volcanic ash with Montmorillonite ($Al_2O_3 \cdot 4SiO_2 \cdot H_2O$). The acceptable amount is up to 3%, but 1.10% is preferred.

Other possible suspending agents are Macaloid and Vee Gum T. Macaloid increases the drying rates of water suspended glazes, and it very similar to a very clean, white type of Bentonite. Vee Gum T is a Macaloid type Bentonite suspending agent for glazes, and may also be used as a surface hardener. It is a plastic hydrous magnesium silicate used to give plasticity to whiteware and refractory bodies.

A suspension agent is also optional and is used to thicken the glaze to improve adhesion. It is especially useful if the glaze is to be stored for a period of time. The preferred amount is up to 3%, but the amount is 0.22% in the preferred embodiment. Magnesium Sulfate ($MgSO_3 \cdot 6H_2O$) is the preferred ingredient.

Deflocculants are used to break up and disperse agglomerates and to help form a stable colloid. It makes the mass more fluid and keeps the specific gravity high and the viscosity low. Poly 211 is a standard off the shelf deflocculant that is used when thick slurries are desired. Sodium silicate may also be used for this purpose.

Preservatives are used in manufacturing aqueous slurries. One that may be used is Vancide TH, made by R. T. Vanderbilt Co., Inc.

In an alternate embodiment, lead based materials may be used. This may be accomplished by a glaze comprising: 82.60%±5% of a leaded Frit, 6–30% of a leaded flux, such as White Lead, 0.46–1.06% of a thickener and 4.91–15.91% of a phosphorus pigment. In the preferred embodiment, the thickener is a Cellulose Gum such as carboxmethylcellulose. The White Lead takes the place of the first and second fluxes. Due to the fact that the phosphorus pigment starts to decompose at 1400° F., the leaded frit should have a melting point below 1400° F. In some cases, up to 3% of a suspending agent, such as Bentonite, may be used in the glaze and, when it is used, it serves to overcome settling in the glaze mixture and keeps the ingredients floating. For such glazes, the preferred ingredients would be 81.53% leaded frit, 15.68% White Lead, 10% Phosphorus Pigment, 2.1% Bentonite and 0.69% carboxymethylcellulose. Such a leaded glaze would be made in the same manner as the above described unleaded glaze.

Leaded fluxes other than just White Lead may be used. Among them are Lead Borate, Lead Oxide and Lead Silicates, such as Lead Bisilicate, Lead Monosilicate and Tribasic Lead Silicate.

To make up an 8 gallon batch of glaze, one utilizes 665 fluid ounces of water, 747.74 ounces of Ferro Frit #3269, 29.96 ounces of Lithium Carbonate, 19.92 ounces of Borax 10 mole powder, 9.96 ounces of Bentonite 325 mesh (clay), 1.99 ounces of Magnesium Sulfate, 5.97 ounces of Carboxymenthylcellulose type 7M powder, 89.71 ounces of phosphorus pigment #P170140 Blue, 15 grams of Preservative Vancide TH, and 0.5 fluid ounces of Deflocculant Poly 211.

First, place ¾ of the water (about 500 fluid ounces) in a mixer and add the Preservative, the Deflocculant and the Carboxymenthylcellulose. Then hard mix until the Carboxymenthylcellulose powder is completely dissolved. This is done at room temperature (about 70° F.–75° F.). Slight variations in the temperature will not alter the mixing results. It is generally easier to mix if the water temperature is above 70° F.

The dry materials are then added, starting with the Frit, Lithium Carbonate, Borax, Magnesium Sulfate and the phosphorus pigment with Bentonite being last. This is preferably done at room temperature (about 70° F.–75° F.). Ingredients are added in this order for easy mixing, and it is not necessary to wait until one ingredient completely dissolves before the next ingredient is added.

After the ingredients are mixed thoroughly, specific gravity should be tested. The specific gravity is defined for these purposes as the ratio of the density (weight) of a substance to the density of another substance taken as a standard, such as water. A 575 milliliter beaker of this glow in the dark glaze should be 800 grams if it is designated for storage. The balance of water is added until 800 grams is reached.

The glaze is now ready to be ball milled. Grinding of the glaze is necessary to a fineness that permits the glaze to pass easily through a 120-mesh sieve. In most cases, the glaze is ground when wet. When completed, the glaze will be smooth and have an uniform suspension that will spread evenly upon application on the surface of the ceramic bisque.

If the glaze is to be stored for a period of time, it is possible to dry grind. Then mix the water only to the amount needed at that moment for that application. Since Borax is a soluble material in water and can change the glaze to a jelly-like state, dry grinding can be utilized.

Four basic methods can be used for applying the glaze to the ceramic bisque: brushing, dipping, spraying or the water fall system.

For determining the viscosity of the glaze, a 4 ounce container with a small hole at the bottom is used. 4 ounces of water runs out of the container in 8 seconds. By similar means, the viscosity of the glaze for the 4 application methods can be determined.

For brushing, the glaze should be about the same thickness as cream or slightly thicker to ensure a proper coating. In particular, the thickness should be such that the glaze runs out of the container from 12 to 35 seconds, and preferably within 13–15 seconds. Usually 2 or 3 coats should be painted on the bisque to ensure uniform application.

If dipping is used, glazes should be the same thickness as cream or somewhat thinner. In particular, the thickness should be such that the glaze runs out of the container from 12 to 18 seconds, and preferably within 14 seconds. This allows the glaze to seep into and penetrate the pores of the ware.

When spraying is used, glazes should be the thickness of milk and should be grounded, so the materials should pass easily through a 120-mesh sieve. This separates any course particles that can clog the spray gun. In particular, the thickness should be such that the glaze runs out of the container from 12 to 35 seconds, and preferably within 14 seconds.

In utilizing the water fall system, the glaze is the same as used for spraying. In particular, the thickness should be such that the glaze runs out of the container from 12 to 20 seconds, and preferably within 14 seconds. The ceramic bisque is on a conveyor and goes through a film of glaze, like going underneath a water fall.

After the glaze is applied to the ceramic bisque, the bisque is fired. A preferred firing program is to increase the kiln temperature from its starting room temperature level by 400° F. per hour up to 1000° F., then increase by 90° F. per hour from 1000° F. up to 1250° F. and then holding at 1250° F. for 1 hour. This completes the firing. It may be appreciated that other standard types of firing may be used, depending on the particular kiln.

This glow in the dark glaze may be used on any ceramic product, including tiles, dinnerware, door knobs, emergency exit signs, decorative enhancements, jewelry, arts, cars, light switches, kitchen and bathroom accessories, faucets, toys, frames, pottery, handles for all purposes, knobs for cabinets, pens, and containers.

There are many other useful purposes for the glow in the dark glaze of this invention, as applied to ceramic products, such as:

Light switches that glow in the dark, so there is no need to fumble in the dark to find the switch;

Glow in the dark ceramic tiles can be used as emergency signs to illuminate the way or point the way to the exits of the buildings, such as schools or hospitals, if there is an unpredicted power outage or brown out.

The invention is described in detail with reference to a particular embodiment, but it should be understood that various other modifications can be effected and still be within the spirit and scope of the invention.

I claim:

1. A glaze providing a night glow finish to ceramics, comprising: 82.60%±5% of Frit, 1.31–10.31% of a first flux, 1.20–7.20% of a second flux, 0.46–1.06% of a thickener and 4.91–15.91% of a phosphorus pigment.

2. A glaze according to claim 1, further comprising a preservative.

3. A glaze according to claim 1, further comprising a deflocculant.

4. A glaze according to claim 1, further comprising up to 4.10% of a suspending agent.

5. A glaze according to claim 1, further comprising up to 3.22% of a suspension agent.

6. A glaze according to claim 4, wherein the suspending agent is selected from the group comprising Bentonite, Macaloid and Vee Gum T.

7. A glaze according to claim 5, wherein the suspension agent is Magnesium Sulfate.

8. A glaze according to claim 1, wherein the first and second flux are selected from the group comprising Lithium Carbonate, Borax, Sodium Nitrate, Potassium Nitrate, Potassium Carbonate, Soda Ash, Sodium Bicarbonate, Boric Acid, Anhydrous Borax and Cadmium.

9. A glaze according to claim 1, wherein the first flux is Lithium Carbonate.

10. A glaze according to claim 1, wherein the second flux is Borax.

11. A glaze according to claim 1, wherein the thickener is a cellulose gum.

12. A glaze according to claim 1, wherein the thickener is selected from the group comprising carboxmethylceullulose, Arabic Gum, Tragacanth Gum and Dextrin.

13. A glaze according to claim 1, wherein the thickener is carboxmethylceullulose.

14. A glaze according to claim 1, comprising: 82.60 of said Frit, 3.31% of said first flux, 2.20% of said second flux, 0.66% of said thickener and 9.91% of said phosphorus pigment.

15. A glaze according to claim 14, further comprising 1.10% of a suspending agent.

16. A glaze according to claim 14, further comprising 0.22% of a suspension agent.

17. A glaze according to claim 15, further comprising 0.22% of a suspension agent.

18. A glaze according to claim 14, wherein the first flux is Lithium Carbonate, the second flux is Borax, and the thickener is a Cellulose Gum.

19. A glaze according to claim 14, wherein the first flux is Lithium Carbonate, the second flux is Borax, and the thickener is carboxmethylceullulose.

20. A glaze according to claim 15, wherein the first flux is Lithium Carbonate, the second flux is Borax, the suspending agent is Bentonite, and the thickener is carboxmethylceullulose.

21. A glaze according to claim 16, wherein the first flux is Lithium Carbonate, the second flux is Borax, the thickener is carboxmethylceullulose and the suspension agent is Magnesium Sulfate.

22. A glaze according to claim 17, wherein the first flux is Lithium Carbonate, the second flux is Borax, the suspending agent is Bentonite, the thickener is carboxmethylceullulose and the suspension agent is Magnesium Sulfate.

23. A glaze according to claim 22, wherein the glaze is mixed into a solution including water, a preservative and a deflocculant.

24. A glaze according to claim 1, wherein there is no lead.

25. A lead-free glaze providing a night glow finish to ceramics, comprising: 82.60%±5% of Frit, 1.31–10.31% of Lithium Carbonate, 1.20–7.20% of Borax, 0.46–1.06% of a Cellulose Gum and 4.91–15.91% of a phosphorus pigment.

26. A glaze according to claim 25, comprising: 82.60% of said Frit, 3.31% of said Lithium Carbonate, 2.20% of said Borax, 0.66% of said Cellulose Gum and 9.91% of said phosphorus pigment.

27. A glaze according to claim 25, wherein the Cellulose Gum is selected from the group comprising carboxmethylceullulose, Arabic Gum, Tragacanth Gum and Dextrin.

28. A glaze according to claim 26, wherein the Cellulose Gum is selected from the group comprising carboxmethylceullulose, Arabic Gum, Tragacanth Gum and Dextrin.

29. A glaze according to claim 25, wherein the Cellulose Gum is carboxmethylceullulose.

30. A glaze according to claim 26, wherein the Cellulose Gum is carboxmethylceullulose.

31. A glaze according to claim 25, further comprising up to 4.10% of a suspending agent selected from the group comprising Bentonite, Macaloid and Vee Gum T.

32. A glaze according to claim 25, further comprising up to 4.10% of Bentonite.

33. A glaze according to claim 26, further comprising up to 4.10% of a suspending agent selected from the group comprising Bentonite, Macaloid and Vee Gum T.

34. A glaze according to claim 26, further comprising up to 4.10% of Bentonite.

35. A glaze according to claim 25, further comprising up to 3.22% of Magnesium Sulfate.

36. A glaze according to claim 26, further comprising up to 3.22% of Magnesium Sulfate.

37. A glaze according to claim 29, further comprising up to 3.22% of Magnesium Sulfate.

38. A glaze according to claim 32 further comprising up to 3.22% of Magnesium Sulfate.

39. A glaze according to claim 25, further comprising a preservative.

40. A glaze according to claim 26, further comprising a preservative.

41. A glaze according to claim 29, further comprising a preservative.

42. A glaze according to claim 32, further comprising a preservative.

43. A glaze according to claim 25, further comprising a deflocculant.

44. A glaze according to claim 26, further comprising a deflocculant.

45. A glaze according to claim 29, further comprising a deflocculant.

46. A glaze according to claim 32, further comprising a deflocculant.

47. A glaze according to claim 42, further comprising a deflocculant.

48. A method of making a lead-free glow in the dark wet glaze for ceramics, wherein the glaze consists of 82.60%±5% of Frit, 1.31–10.31% of Lithium Carbonate, 1.20–7.20% of Borax, 0.46–1.06% of carboxmethylceullulose, 4.91–15.91% of a phosphorus pigment, up to 4.10% of Bentonite, up to 3.22% of Magnesium Sulfate, a preservative and a deflocculant, comprising the steps of: adding water to a mixer; adding the Preservative, the Deflocculant and the carboxymenthylcellulose to the water in the mixer; mixing until the carboxymenthylcellulose is completely dissolved; adding the Frit, Lithium Carbonate, Borax, Magnesium Sulfate and the phosphorus pigment to mixture; adding bentonite to the mixture; mixed thoroughly; checking specific gravity of mixture; and grinding the mixture.

49. A glaze providing a night glow finish to ceramics, comprising: 82.60%±5% of a leaded Frit, 6–30% of a leaded flux, 0.46–1.06% of a thickener and 4.91–15.91% of a phosphorus pigment.

50. A glaze according to claim 49, wherein the thickener is a Cellulose Gum.

51. A glaze according to claim 50, wherein the Cellulose Gum is Carboxymenthylcellulose.

52. A glaze according to claim 49, further comprising up to 3% of a suspending agent.

53. A glaze according to claim 52, wherein the suspending agent is Bentonite.

54. A glaze according to claim 49, wherein the leaded flux is selected from the group comprising White Lead, Lead Borate, Lead Oxide and Lead Silicates.

55. A glaze according to claim 49, wherein the leaded flux is White Lead.

56. A glaze according to claim 49, comprising 81.53% of a leaded Frit, 15.68 of a leaded flux, 0.69% of a thickener and 10.0% of a phosphorus pigment.

57. A glaze according to claim 56, further comprising 2.10% of Bentonite.

58. A glaze according to claim 57, wherein the thickener is Carboxymenthylcellulose.

59. A glaze according to claim 58, wherein the suspending agent is Bentonite.

60. A glaze according to claim 59, wherein the leaded flux is White Lead.

* * * * *